3,228,790
NONWOVEN FABRIC CONTAINING POLYOLEFIN
FIBERS BONDED TOGETHER WITH A MIXTURE
OF POLYOLEFIN AND ACRYLIC RESINS
Fred H. Sexsmith, Highland Park, and Frank A. Jones,
East Brunswick, N.J., assignors, by mesne assignments,
to Johnson & Johnson, New Brunswick, N.J., a corporation of New Jersey
No Drawing. Filed May 26, 1961, Ser. No. 112,754
10 Claims. (Cl. 117—138.8)

The present invention relates to bonded nonwoven fabrics, to methods of making such bonded nonwoven fabrics and to binders therefor. More particularly, the present invention relates to bonded nonwoven fabrics comprising polyolefin fibers and to binders containing polyolefinic materials.

Bonded nonwoven fabrics are generally produced by depositing an adhesive bonding material on a web of loosely assembled overlapping and intersecting fibers to bond the web and render it sulf-sustaining.

The fibers generally used have been cotton or rayon though for specific end uses fibers of polyamides, for example, nylon; polyesters, for example, "Dacron"; and acrylics, for example, "Orlon," have been used.

One of the newer classes of fibers developed in recent years has been the polyolefin fibers, that is, fibers formed from long chain synthetic polymer compounds of at least 85% by weight of ethylene, propylene or other olefin units or mixtures thereof. Yarns made from such fibers have found considerable use in woven fabrics due to their excellent resistance to acids, alkalis and other chemicals making them very suitable for filtration purposes.

Fabrics woven from polyolefin yarns have found considerable use in the electrical industry because of the low moisture pickup of polyolefin fibers and in the lecorative fabric industry because of their heat-shrinking characteristics.

Polyolefin fibers have had little or no use in the nonwoven fabric industry as it is very difficult to adhesively bond a web containing polyolefin fibers. This adhesion problem is probably caused by the excellent resistance that polyolefin fibers have to most chemicals, hence the bonding agents will not "bite" or grip the polyolefin fiber to form an adhesive bond and produce a self-sustaining nonwoven fabric. The problem exists with acrylic resin binders although such binders have been used with most natural and synthetic fibers such as cotton, rayon, nylon and others because of the excellent resistance of the acrylics to water and most solvents allowing for the production of launderable and dry-cleanable fabrics and the fact that many acrylic resins are relatively soft yet form a strong adhesive bond.

It is an object of the present invention to provide an adhesive acrylic resin bonding agent for bonding fibrous webs containing polyolefin fibers.

It is another object of the present invention to provide a nonwoven fabric of adhesively bonded polyolefin fibers.

It is still another object of the present invention to provide a method for adhesively bonding fibrous webs containing polyolefin fibers.

In accordance with the invention, an aqueous dispersion wherein the dispersed phase includes from about 20% to about 80% by weight of the dispersed phase of a water-insoluble colloidal polyolefin resin in the form of particles having an average diameter of less than 100 microns and from about 80% to about 20% by weight of the dispersed phase of an acrylic resin selected from the group consisting of the polymers, copolymers and mixtures thereof of the lower alkyl esters of acrylic acid wherein said alkyl group contains from 1 to 8 carbon atoms, is applied to a fibrous web containing polyolefin fibers and the dispersing medium then removed and the fabric heated, and adhesively bonded nonwoven fabric containing polyolefin fibers results.

The colloidal polyolefin resin to be dispersed along with the acrylic resin may be selected from a broad group of such materials. Representative examples are polyethylene, commonly identified by the chemical formula $[-CH_2CH_2-]_x$; polyproylene, commonly identified by the chemical formula $[-CH_2CH(CH_3)-]_x$; poly-1-butene, commonly identified by the chemical formula $[-CH_2CH(C_2H_5)-]_x$; poly-2-butene, commonly identified by the chemical formula $$[-CH(CH_3)CH(CH_3)-]_x$$

and polyisobutylene, commonly identified by the chemical formula $[-CH_2C(CH_3)_2-]_x$.

Such polyolefin resins have excellent stability and chemical inertness and hence do not discolor when heated or upon aging. They are non-toxic and their use in the present invention renders the final products particularly attractive for surgical, medical and sanitary purposes. Such polyolefin resins are available commercially in aqueous emulsion form and may be so used. They are also available as finely divided powders which may be dispersed in aqueous media with traces of a wetting agent to furnish stable dispersions of desired solids content.

The average particles size of the colloidal polyolefin particles must fall within a given range to realize the present invention. It has been established that particles having an average diameter of less than about 100 microns are suitable. Microdispersions having an average particle diameter on the order of less than about 1 micron have been found particularly suitable. The lower limit of the particle size of the polyolefin resin will depend on the particular purposes in mind. In some commercial aspects of the present invention an average particle diameter as small as about 0.05 micron has been found satisfactory. One specific commercially available polyethylene resin emulsion having an average particle diameter of about 0.1 micron in an average size distribution within the range of approximately 0.05 micron to 1 micron has been found very satisfactory.

The acrylic resin to be dispersed along with the polyolefin resin must be selected from polymers of the lower alkyl esters of acrylic acid wherein the alkyl group contains from 1 to 8 carbon atoms. Among suitable examples of such acrylic esters are ethyl acrylate, butyl acrylate, 2-ethyl hexyl acrylate. The acrylic resin may be of a homopolymer, a copolymer or a mixture of polymers, that is, the acrylic resin may be a homopolymer of one of the lower alkyl esters of acrylic acid, a copolymer of two or more of the lower alkyl esters of acrylic acid, a copolymer of one or more of the lower alkyl esters of acrylic acid with anther monomer such as vinyl acetate, vinyl chloride, styrene, etc. or it may be mixtures of such compounds. The acrylic resin may also have additives such as emulsifiers, stabilizers, dyes, waterproofing agents, flame-proofing agents, mildew-proofing agents, cross-linking agents, etc. There are also commercially available acrylic resins which are polymers of the lower alkyl esters of acrylic acid which have had incorporated in the polymer chain reactive groups such as methylolated amide groups, carboxyl groups and amine groups. These groups may be cross-linked directly with reactive groups present in other polymer chains or via external cross-linking agents such as aminoplast reactants, diepoxides, etc. upon the application of heat. Such acrylic resins are still basically polymers of the lower alkyl esters of acrylic acid and are suitable for use in the present invention.

The manner in which the acrylic resin and the polyolefin resin are mixed will depend upon the desired solids content of the final dispersion and the form in which the resins are available. Generally the acrylic resins suitable for use in this invention are available as aqueous emulsions and if a polyolefin resin emulsion is being used the two aqueous emulsions simply may be mixed together in the desired proportions accompanied by stirring. If the polyolefin resin is available as a finely divided powder it may be added directly to the acrylic resin emulsion in the desired amount accompanied by stirring to form the dispersion of the present invention.

The aqueous dispersion of polyolefin resins and acrylic resin may be applied to the fibrous web as an over-all impregnation, such as by dipping, spraying or immersing processes, or it may be applied by intermittent binder printing or other predetermined or random binder deposition techniques. If the dispersion is applied by printing techniques in the form of discrete binder areas such areas may be in the form of continuous or discontinuous straight or wavy lines, circles, annuli, rectangles, triangles or other similar regular or irregular figures by way of example.

After the binder dispersion has been applied to the fibrous web, the dispersing medium (water) must be removed and the binder heated at an elevated temperature for a short period of time to soften the polyolefin resin so that it will cohere with the acrylic resin. The binder will then strongly adhere to the polyolefin fibers.

Temperatures as low as 200° F. have been found satisfactory for some acrylic resin-polyolefin resin dispersions and temperatures as high as 400° F. have been found satisfactory for other acrylic-polyolefin resin dispersions. Temperature ranges of from about 290° F. to about 360° F. are preferred.

The time exposure is interdependent upon the temperature and a normal heating time of from about 15 seconds up to about 5 minutes and preferably from about 1 minute to 2 minutes has been found satisfactory.

The amount of binder material (dry solid basis) to be applied to the fibrous starting layer or web may range from as little as about 1% to about 100% or more by weight of the starting web (dry basis) and preferably from about 10% to about 25% by weight. The surface area of the web covered by the binder will naturally be about 100% in the case of over-all impregnation. In the case of an intermittent pattern, the surface area of the web covered by the binder may be from about 7% to about 35% of the total area of the web. However, in general it is preferred that the binder-containing areas cover at least about 12% of the total surface area of the fabric.

The proportions by weight (dry basis) of the polyolefin resin binder material and the acrylic resin binder material in the bonded non-woven fabric may be varied within relatively wide limits. From about 20% to about 80% by weight of the total binder material employed may be a polyolefin resin with about 80% to about 20% by weight of the total binder material employed being the acrylic resin. Within the more commercial aspects of the present invention it has been found preferable to use from about 30% to about 60% by weight of the polyolefin resin and from about 70% to about 40% by weight of the acrylic resin while the most suitable binder is about 40% by weight of the polyolefin resin and about 60% by weight of the acrylic resin.

However, it should be pointed out that other materials may also be present in the final non-woven fabric or in the aqueous dispersion such as, emulsifiers, stabilizers, cross-linking agents, dyes, pigments, antifoaming agents, etc. Such materials may even be present in major amounts depending on the desired end use of the non-woven fabric being produced.

The fibrous web employed in practicing the present invention may be produced in any known manner such as by carding, garnetting, air-laying, water-laying, etc. the selected fibers or mixtures thereof. The web may consist of a single ply or a plurality of superimposed plies. When the web consists of a multi-ply structure the fibers of the respective webs may be the same or different. The fiber lay in the web may be random or oriented. In multi-ply structures wherein the fibers are oriented, the lay of the fibers in adjacent plies may be at right angles to each other or at other angles if desired. Each different type of web has its own properties and characteristics and generally the type of web will depend upon the desired end use for the final non-woven fabric being produced.

To obtain the advantages of the present invention the fibrous web must contain at least about 5% of a polyolefin fiber and may be made of 100% polyolefin fibers if desired. The polyolefin fibers, if less than 100% are present, may be either uniformly distributed throughout the fibrous web or if the structure is multi-plied the polyolefin fibers may be concentrated in one ply. If the fabric is less than 100% polyolefin fibers the remaining portion may be any one or a combination of other well-known fibers, such as the natural fibers, for example, cotton, flax, wood, silk, wool, jute, asbestos, ramie, "rag" or abaca; mineral fibers, for example, glass; artificial fibers, for example, viscose rayon, cuprammonium rayon, ethyl cellulose or cellulose acetate; synthetic fibers, for example, polyamides, that is nylon 6, nylon 66; polyesters, that is "Dacron"; acrylics, that is, "Orlon," "Acrilan," "Dynel," etc.

While relatively long textile-type fibers above normal paper-making lengths and close to normal textile lengths, say of about ¼ inch to 2 inches or longer, are preferred for textile applications, shorter fibers below ¼ inch in length and within the paper-making range may also be used. It is preferred, however, that the shorter paper-making fibers be unbeaten or substantially unhydrated if a textile-like fabric is desired as the end product. In this connection shorter unhydrated fibers of wood pulp in a paper-making length for instance may be mixed with longer fibers in such a way that the longer fibers will contribute the strength desired in the resulting fabric while the shorter wood fibers will decrease its cost.

The denier of the individual synthetic fibers referred to above preferably is in the range of the approximate thickness of the natural fibers mentioned and consequently deniers in the range of from about 1 to about 5 are preferred. Where greater opacity or greater covering power is desired, special fiber deniers of down to about ¾ or even ½ may be employed. Where desired, deniers of up to about 8, 10, 15 or even higher may be used. The minimum and maximum denier are naturally dictated by the desires or requirements for producing a particular fibrous web by the machines and methods for producing the same, and so forth.

The weight of the individual fibrous web or layer of starting material may be varied within relatively wide limits, depending upon the requirements of the finished product. A single thin web of fibers such as produced by a card may have a weight of from about 40 to about 200 grains per square yard. The minimum weight of non-woven fabric contemplated by the present invention is, however, about 120 grains per square yard obtained by plying three webs. The maximum weight may range upwards to about 2500 or more grains per square yard. Within the more commercial aspects of the present invention, however, web weights of from about 140 grains per square yard to about 2400 grains per square yard are contemplate.

The invention will be further illustrated in greater detail by the following specific examples. It should be understood, however, that although these examples may describe in particular detail some of the more specific features of the invention they are given primarily for purposes of illustration and the invention in its broader aspects is not to be construed as limited thereto. The percentages indicated are by weight unless specifically stated otherwise.

EXAMPLE 1

The starting fibrous material is a card web weighing about 600 grains per square yard and containing 100% 3 denier, two inch staple length polypropylene fibers. The improvement in adhesive bonding and strength of the nonwoven fabrics produced is determined as follows: Test samples of the card web approximately 18 inches long and 8 inches wide are selected and are lightly prebonded with an acrylic resin emulsion at about 3% solids content.

The aqueous dispersions used to treat the above-mentioned test samples are made by taking a soft acrylate resin emulsion (46% solids) comprising primarily an ethyl acrylate polymer, sold by Rohm and Haas Company under the trade name Rhoplex HA-8, which has had reactive groups disposed along the polymer chain so that the resin may be cross-linked upon the application of heat. To this resin emulsion is added polyethylene. The polyethylene used may be a resin emulsion (39.6% solids) furnished by the Spencer Chemical Company and the polyethylene particles have a particle size range of from about 0.1 to about 1 micron. This dispersion is then diluted with water to form a dispersion containing 20% total solids.

Six different binder formulations all having the same total per cent solid content (that is 20%) but varying proportion of the acrylic resin to the polyethylene resin as per cent of the total solids are prepared as follows:

*Table I.—Amount of acrylic resin and polyethylene resin used in the binder formulations of Examples 1–6*

| Sample Number | Acrylic Resin (Grams) | Polyethylene Resin (Grams) | Percent Acrylic Resin of the Total Binder Solids | Percent Polyethylene Resin of the Total Binder Solids |
|---|---|---|---|---|
| 1 | 92 | | 100 | 0 |
| 2 | 92 | 23 | 80 | 20 |
| 3 | 92 | 61.5 | 60 | 40 |
| 4 | 92 | 137 | 40 | 60 |
| 5 | 92 | 357 | 20 | 80 |
| 6 | | 79 | 0 | 100 |

Each of the above dispersions is buffered to a pH of 6 with ammonia. The are then applied substantially uniformly to the card web test samples to about 100% wet pickup by weight by hand mangling procedures. The impregnated webs are then air-dried and cured at about 300° F. for about 2 minutes to allow the polyethylene to soften and cohere with the acrylic resin and to adhere strongly to the polyolefin fibers to produce a well-bonded nonwoven fabric weighing approximately 720 grains per square yard, 120 grains of which is binder. The strength of each of the sample fabrics produced is tested by randomly talking 5 samples from each fabric. The samples are 1 inch by 6 inches in size. The dry strength is determined by placing each of the samples in the jaws of an Insco tensile tester, an instrument manufactured by the Insco Company of Natick, Massachusetts, specifically for testing tensile strength of fabrics. A force is applied to the fabric until it breaks. When determining the wet strength of the fabrics a similar procedure is followed except immediately prior to placing the sample in the Insco tensile tester they are saturated with 3 cc. of water and allowed to dry for 30 seconds on kraft paper. This procedure is followed with each individual sample in order to obtain an average result of the fabric tested.

The following are the results of the dry strength and the wet strength of each of the above-described sample fabrics:

*Table II.—Strength of fabrics and fabric descriptions for the nonwoven fabrics produced in Examples 1–6*

| Sample Number | Fiber Weight in Grains | Acrylic Resin Weight in Grains | Polyethylene Resin Weight in Grains | Percent Polyethylene Resin of Total Binder Weight | Dry Strength in Pounds per Square Inch per 100 Grains of Fabric | Wet Strength in Pounds per Square Inch per 100 Grains of Fabric |
|---|---|---|---|---|---|---|
| 1 | 600 | 120 | | 0 | 1.28 | 0.35 |
| 2 | 600 | 96 | 24 | 20 | 1.28 | 0.65 |
| 3 | 600 | 72 | 48 | 40 | 1.60 | 1.10 |
| 4 | 600 | 48 | 72 | 60 | 1.40 | 0.95 |
| 5 | 600 | 24 | 96 | 80 | 1.30 | 0.85 |
| 6 | 600 | 0 | 120 | 100 | 1.08 | 0.87 |

As may be seen from the foregoing table, the strength of the final nonwoven fabric improves considerably with the use of combinations of acrylic resin bonding material and polyethylene resin bonding material as compared with the use of either material alone.

EXAMPLE 2

The starting fibrous web is a 400 grain per square yard card web of 50% viscose rayon fiber 1½ denier, 1 9/16 inch staple length and 50% polyethylene fiber, 3 denier 2 inch staple length. An aqueous dispersion is prepared by taking 200 grams of a soft acrylate resin emulsion consisting primarily of ethyl acrylate and sold by the Rohm & Haas Company under the trade name Rhoplex B–15 (46% total solids content) and 5 grams of a modified melamine formaldehyde reactant resin sold by the American Cyanamid Company under the trade name Aerotex MW (80% total solids content) and adding to this 60 grams of a finely powdered polyethylene resin having an average particle size of less than 75 microns and sold by the United States Industrial Chemical Company under the trade name Microthene. This dispersion is diluted with about 400 grams of water and buffered with ammonia to a pH of 6 to make a stable aqueous dispersion having a total solids content of approximately 20%. The fibrous web is then printed in an intermittent binder pattern such as disclosed in FIGURE 1 of U.S. Patent 2,705,687. The fabric is then dried and cured at 315° F. for about 1 minute to soften and cohere the polyethylene particles with the acrylic resin and to adhere the binder to the polyethylene fibers. The final weight of the fabric is about 460 grains per square yard. The fabric produced is well bonded and has excellent strength properties as compared to a similar fabric made by similar techniques but omitting the polyethylene powder from the aqueous acrylic resin dispersion.

EXAMPLE 3

An aqueous dispersion of acrylis resin and polyisobutylene resin is prepared as follows: 400 grams of an aqueous acrylic emulsion comprising primarily 2-ethyl hexyl acrylate (40% solids), intermixed with 545 grams of a polyisobutylene resin emulsion, 55% solids, average particle size about 0.5 micron with the particle size distribution from about 0.05 micron to about 1 micron. The polyisobutylene resin emulsion has a specific gravity of 0.96 and a weight per gallon of about 8.1 pounds and a pH of 5–6. To this mixture is added about 600 grams of water to form a stable dispersion of acrylic resin and polyisobutylene resin of about 30% total binder solids content. The dispersion is buffered with ammonia to a pH of 6.

This dispersion is printed on a 200 grain per square yard, 90% rayon, 1½ denier, 2 inch staple length, 10% polypropylene fiber, 3 denier, 2 inch staple length card web in a print pattern of four horizontal wavy lines per inch. The print lines run the width of the web and cover less than 50% of the total surface area of the web. The fabric is then dried and cured at about 300° F. for 2 minutes and the resultant nonwoven fabric contains between 35 and 40 grains per square yard of binder.

The fabric is well-bonded and is extremely soft, suitable for use as the cover for an absorbent medium such as a sanitary napkin cover.

Although several specific examples of the inventive concept have been described, the same should not be construed as limited thereby nor to the specific substances or constructions mentioned therein but to include various other equivalent substances and constructions as set forth in the claims appended hereto.

It is understood that suitable changes, modifications and variations may be made without departing from the spirit and the scope of the invention.

What is claimed is:

1. A bonded nonwoven fabric comprising a layer of overlapping, intersecting fibers at least 5% of which are polyolefin fibers and a bonding agent bonding said fibers together to form a nonwoven fabric, said bonding agent consisting essentially of: from about 20% to about 80% by weight of a water-insoluble polyolefin resin in the form of particles having an average particle diameter of less than about 100 microns and from about 80% to about 20% by weight of an acrylic resin selected from the group consisting of polymers, copolymers and mixtures thereof of the lower alkyl esters of acrylic acid wherein said alkyl groups contain from 1 to 8 carbon atoms.

2. A bonded nonwoven fabric as defined in claim 1, wherein the polyolefin resin is polyethylene.

3. A bonded nonwoven fabric as defined in claim 1, wherein the acrylic resin is a polymer of ethyl acrylate.

4. A bonded nonwoven fabric as defined in claim 1, wherein the acrylic resin is a polymer of butyl acrylate.

5. A bonded nonwoven fabric as defined in claim 1, wherein the acrylic resin is a cross-linked polyethyl acrylate polymer resin.

6. A bonded nonwoven fabric comprising a layer of overlapping, intersecting fibers at least 5% of which are polyolefin fibers and a bonding agent bonding said fibers to gether to form a nonwoven fabric, said bonding agent consisting essentially of: from about 20% to about 80% by weight of a water-insoluble polyolefin resin in the form of particles having a particle diameter in the range of from about 0.05 micron to about 1 micron and from about 80% to about 20% by weight of an acrylic resin selected from the group consisting of polymers, copolymers and mixtures thereof of the lower alkyl esters of arcylic acid, wherein said alkyl groups contain from 1 to 8 carbon atoms.

7. A bonded nonwoven fabric comprising a layer of overlapping intersecting fibers at least 5% of which are polyolefin fibers and a bonding agent bonding said fibers to form a nonwoven fabric, said bonding agent consisting essentially of: from about 30% to about 60% by weight of a water-insoluble polyolefin resin in the form of particles having an average particle diameter of less than about 100 microns and from about 70% to about 40% by weight of an acrylic resin selected from the group consisting of polymers, copolymers and mixtures thereof of the lower alkyl esters of acrylic acid wherein said alkyl groups contain from 1 to 8 carbon atoms.

8. A bonded nonwoven fabric comprising a layer consisting of overlapping, intersecting polyolefin fibers and a bonding agent bonding said fibers together to form a nonwoven fabric said bonding agent consisting essentially of: from about 20% to about 80% by weight of a water-insoluble polyolefin resin in the form of particles having an average particle diameter of less than about 100 microns and from about 80% to about 20% by weight of an crylic resin selected from the group consisting of polymers, copolymers and mixtures thereof of the lower alkyl esters of acrylic acid wherein said alkyl groups contain from 1 to 8 carbon atoms.

9. A bonded nonwoven fabric comprising a layer of overlapping intersecting fibers at least 5% of which are polyolefin fibers and a bonding agent bonding said fibers to gether to form a nonwoven fabric, said bonding agent consisting essentially of: from about 30% to about 60% by weight of a water-insoluble polyethylene resin in the form of particles having a particle diameter in the range of from about 0.05 micron to about 1 micron and from about 70% to about 30% by weight of a cross-linked polyethyl acrylate polymer resin.

10. A bonded nonwoven fabric comprising a layer consisting of overlapping, intersecting polypropylene fibers and a bonding agent bonding said fibers together to form a nonwoven fabric, said bonding agent consisting essentially of: from about 40% to about 50% by weight of a water-insoluble polyethylene resin in the form of particles having a particle diameter in the range of from 0.05 micron to about 1 micron and from about 60% to about 50% by weight of a cross-linked polyethyl acrylate polymer resin.

References Cited by the Examiner

UNITED STATES PATENTS

| | | | |
|---|---|---|---|
| 2,335,702 | 11/1943 | Schur et al. | 117—140 |
| 2,346,947 | 4/1944 | Schaansteine | 117—140 |
| 2,509,857 | 5/1950 | Brocherdt et al. | 260—29.6 |
| 2,628,172 | 2/1953 | Jenett | 138—80 |
| 2,628,205 | 2/1953 | Schoemaker | 260—29.60 |
| 2,628,208 | 2/1953 | Loukomsky | 117—138.8 X |
| 2,715,591 | 8/1955 | Graham et al. | 117—140 |
| 2,757,100 | 7/1958 | Simril | 117—140 X |
| 2,996,411 | 8/1961 | Lanterbuck | 117—140 |
| 3,074,834 | 1/1963 | Matlin et al. | 161—170 |

WILLIAM D. MARTIN, *Primary Examiner.*

RICHARD D. NEVIUS, *Examiner.*

UNITED STATES PATENT OFFICE
CERTIFICATE OF CORRECTION

Patent No. 3,228,790 January 11, 1966

Fred H. Sexsmith et al.

It is hereby certified that error appears in the above numbered patent requiring correction and that the said Letters Patent should read as corrected below.

Column 1, line 20, for "sulf-sustaining" read -- self-sustaining --; line 24, after "have" insert -- also --; same column 1, line 35, for "lecorative" read -- decorative --; column 4, line 10, after "web" insert -- used --; column 4, line 67, for "contemplate" read -- contemplated --; column 5, line 62, for "The" read -- They --; column 8, line 3, after "fibers", second occurrence, insert -- together --; line 21, for "crylic" read -- acrylic --; line 56, for "Lanterbuck" read -- Lauterbach --.

Signed and sealed this 10th day of January 1967.

(SEAL)
Attest:

ERNEST W. SWIDER
Attesting Officer

EDWARD J. BRENNER
Commissioner of Patents